US005771839A

United States Patent [19]
Marsh

[11] Patent Number: 5,771,839
[45] Date of Patent: Jun. 30, 1998

[54] BIRD FEEDER

[76] Inventor: Colleen E. Marsh, 21 Misty La., Clarks Summit, Pa. 18411

[21] Appl. No.: 826,723

[22] Filed: Apr. 7, 1997

[51] Int. Cl.⁶ .................................................. A01K 39/01
[52] U.S. Cl. ........................................................ 119/52.2
[58] Field of Search ............................... 119/51.03, 52.2, 119/52.3, 429, 57.8

[56] References Cited

U.S. PATENT DOCUMENTS

| | | |
|---|---|---|
| D. 119,588 | 3/1940 | Hyde . |
| D. 134,678 | 12/1942 | Hyde .................................. 119/52.2 X |
| D. 170,150 | 8/1953 | Cowad ........................................ D31/2 |
| D. 199,530 | 11/1964 | Cruickshank ............................... D31/2 |
| D. 201,245 | 6/1965 | Cruickshank ............................... D31/2 |
| D. 240,743 | 7/1976 | Renfroub .................................. D30/15 |
| D. 267,355 | 12/1982 | Blasbalg ................................... D30/15 |
| D. 274,377 | 6/1984 | Nock ........................................ D30/14 |
| 2,392,532 | 1/1946 | Hyde .................................. 119/51.03 X |
| 2,430,541 | 11/1947 | Thatcher . |
| 2,705,938 | 4/1955 | Greenough . |
| 2,865,326 | 12/1958 | Lowe, Jr. ................................. 119/52.2 |
| 3,645,235 | 2/1972 | Suchla . |
| 3,696,792 | 10/1972 | Bruhns . |
| 3,977,363 | 8/1976 | Fisher, Jr. . |
| 4,167,917 | 9/1979 | Noll . |
| 4,523,546 | 6/1985 | Latham . |
| 4,632,061 | 12/1986 | Tucker et al. . |
| 4,637,344 | 1/1987 | Peterson .................................. 119/52.2 |
| 4,753,195 | 6/1988 | Maggio .................................... 119/52.2 |
| 5,189,984 | 3/1993 | Smith ...................................... 119/52.2 |
| 5,471,951 | 12/1995 | Collins .................................... 119/57.9 |

FOREIGN PATENT DOCUMENTS

| | | | |
|---|---|---|---|
| 80062 | 6/1919 | Switzerland | 119/429 |

OTHER PUBLICATIONS

Potpouri Catalog The Alsto Company Jan. 11, 1991.
Franks Nursery & Crafts 1995.
Garden Craftwork 1941.

*Primary Examiner*—Robert P. Swiatek

[57] ABSTRACT

A bird feeder which protects bird feed from deterioration due to snow and rain by having one side of the bird feeder fully closed by a full wall and another side substantially closed by a partial wall. An outer roof is supported by the full wall and the partial wall over a base plate. At least one silo is mounted against the full wall and on the base plate, each silo having openings at the lower end adjacent the base plate for discharging feed. A cover, which is removable, is mounted over the upper end or the silos. Additional feeding stations may also be provided on both sides of the partial wall.

5 Claims, 1 Drawing Sheet

BIRD FEEDER

BACKGROUND OF THE INVENTION

1. Field of the Invention

This invention relates to a bird feeder and more particularly to a bird feeder which provides silos for gravity distribution of bird feed, the silos having a cover located under a roof to protect the bird feed in the silos from rain and snow.

2. Description of the Prior Art

Bird feeders are preferably constructed with open access so that birds can fly in and out of the bird feeder without restriction and to provide visual observation of the birds while feeding. As a result of the open design, bird feeders permit snow and rain to enter the bird feeder thus causing deterioration of certain bird feed, in particular bird seed.

The Smith Patent, U.S. Pat. No. 5,189,984 discloses a bird feeder enclosure for sheltering a standard bird feeder. The enclosure has only one open side wall and the bird feeder is suspended within the enclosure. Smith thus provides for an inner roof and an outer enclosure, but does not show a hinged roof or cover for covering feeding stations and does not show a silo feeder with a hinged cover.

The Latham Patent, U.S. Pat. No. 4,523,546 is directed to squirrel-proofing bird feeders by means of a flexible covering sheet which is mounted above a standard bird feeder. The sheet functions as a squirrel guard to prevent access to the feeder but by virtue of its position above the feeder, the flexible covering could be considered to function as a primary roof. However, Latham does not disclose a integral feeding station with a hinged roof or a bird feeder with side walls.

Collins, U.S. Pat. No. 5,471,951, discloses an electrified feeder with a single hinged roof member, covering the seed supply.

The Greenough Patent, U.S. Pat. No. 2,705,938 teaches a silo or tubular feeder having a cylindrical body with apertures at the base for access to the seed supply. However, neither Greenough nor Collins discloses a primary roof member or side walls for use with silos for supplying bird seed to a position of accessibility.

Accordingly, it is an object of the present invention to provide a bird feeder which will keep bird seed dry and still readily accessible to birds using the feeder.

Accordingly, it is another object of the present invention to provide a bird feeder which permits easy access for supplying bird seed to the bird feeder.

Accordingly, it is another object of the present invention to provide a bird feeder which is simply and economically constructed and durable.

Other objects and advantages of the present invention will become apparent to those of ordinary skill in the art as the description thereof proceeds.

SUMMARY OF THE INVENTION

A bird feeder is provided which protects bird feed from the weather having a roof and a base with a full wall and a partial wall extending between the roof and the base, the full wall and the partial wall generally opposing one another. At least one silo is mounted against the full wall. A cover, which is removable and may be hinged, is mounted at the top of each silo. Each silo, which is a hollow vertically oriented container, is mounted has openings at its lower end to permit seed to be accessible to the birds. The lower end of each silo rests upon the base. The base includes a main plate and an extension. The extension is located beneath the partial wall and rests on the main plate while extending beyond the main plate outside the partial wall. A net may be mounted on the outside of the partial waill over the extension and a outside dish may be located on the extension against the outside of the partial wall. An inner container may mounted on the extension and against the inside of the partial wall. The bird feeder may be mounted by any means such as eyelets and wire.

DESCRIPTION OF THE DRAWINGS

The invention may be more readily understood by referring to the accompanying drawings, in which.

DESCRIPTION OF THE PREFERRED EMBODIMENT

Figure 1:
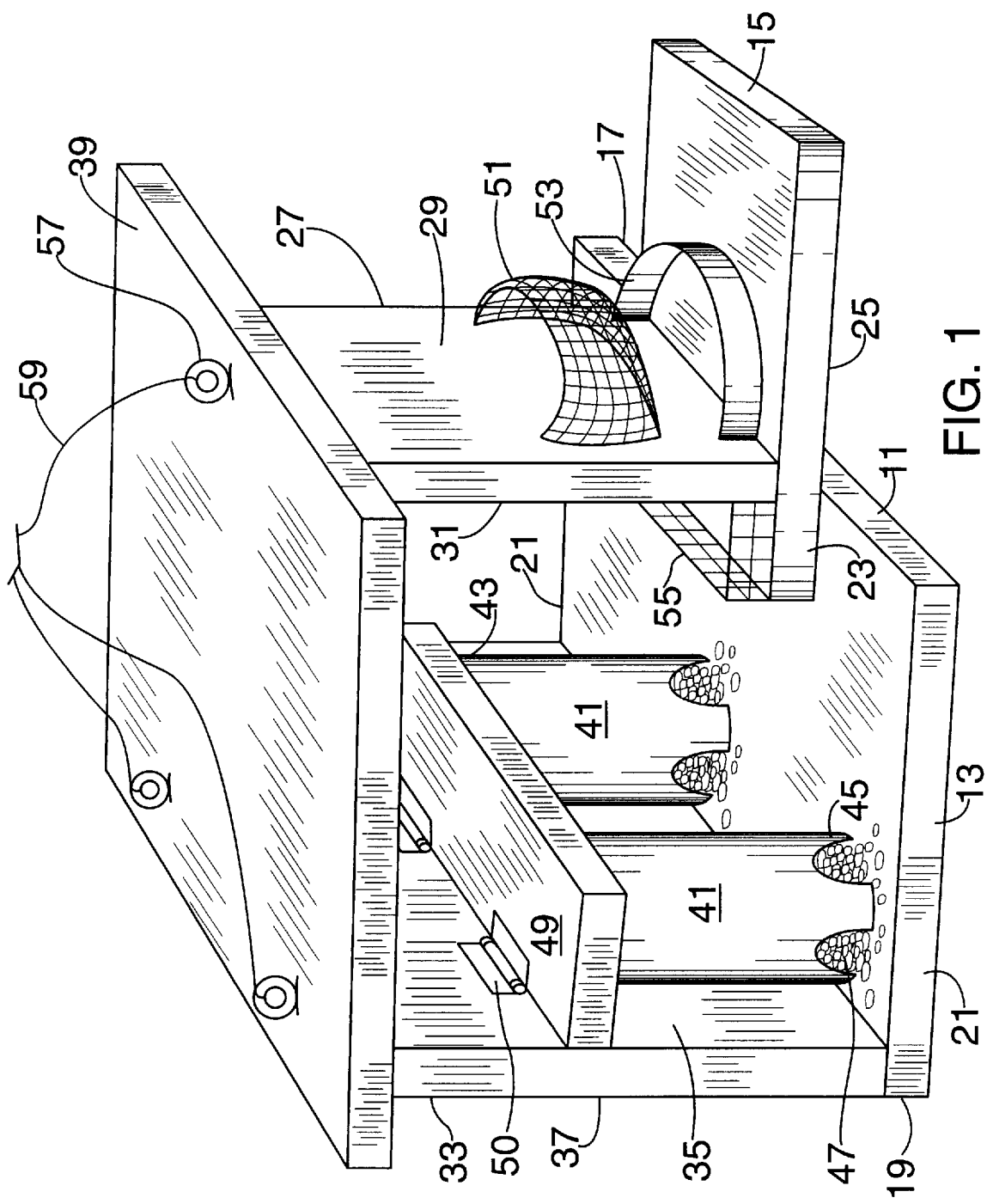
FIG. 1 is a perspective view of the bird feeder showing silos mounted against a full wall and the extension with the outside and inside feeders located on opposite sides of a partial wall opposite the full wall.

The bird feeder, in accordance with this invention, is constructed upon a base 11. The base 11 has two parts, namely a main plate 13 and an extension 15. The main plate 13 preferably has a rectangular shape but could have numerous configurations and might even be oval. The main plate 13 has a front edge 17 and a rear edge 19 which are substantially parallel to one another and two side edges 21 between the front edge 17 and the rear edge 19. If the main plate 13 iis rectangular, the side edges 21 are located generally parallel to one another and substantially at right angles to the front edge 17 and the rear edge 19. Even with the main plate 13 having an oval shape, there would be a front edge 17 and rear edge 19 as well as two side edges 21. The edges of the main plate 13 and the extension 15 are preferably and generally parallel with one another but the extension 15 has substantially less width than the main plate 13. The extension 15 is also preferably rectangular but can also be oval or have many other possible configurations. The extension 15 has a minor portion 23 and a major portion 25 which is larger than the minor portion 23. Only the minor portion 23 of the extension 15 overlaps the main plate 13 and is affixed to the main plate 13 by any suitable means. The major portion 25 of the extension 15 extends away from the front edge 17 and the rear edge 19 of the main plate 13. The extension 15 is generally located midway between the two side edges 21.

At the front edge 17 of the main plate 13 but on the extension 15, a partial wall 27 extends upwardly substantially at right angles to the main plate 13 and the extension 15. The partial wall 27 has a width substantially the same as the extension 15 and has an outside surface 29 and an inside surface 31. The partial wall 27, like the extension 15, has a width which is only a part of the width of the main plate 13 from side edge 21 to side edge 21. The partial wall 27 is generally aligned with the extension 15 and is located midway between the two side edges 21.

Opposite the partial wall 27 is a full wall 33 which has a width substantially the same as the width of the main plate 13. The full wall 33 is located at the rear edge 19 of the main plate 13 opposite from the front edge 17 where the partial wall 27 is located. The height of the partial wall 27 and the full wall 33 above the main plate 13 is substantially the same. The full wall 33 has an inside surface 35 and an outside surface 37. The inside surface 31 of the partial wall 27 and the inside surface 35 of the full wall 33 face one another. A roof 39 is mounted on the partial wall 27 and the full wall 33. The roof 39, as is shown in FIG. 1, is a flat roof which could be at various degrees of pitch and which provides the protection needed. This is the simplest roof 39 to construct but a peaked roof may be used, particularly if the ends are enclosed from the peak to the lower edge of each side to restrict rain and snow from entering the bird feeder.

Silos 41 are mounted on the main plate 13 and against the full wall 33. The silos 41 are vertically oriented against the full wall 33 and are preferably circular in cross section but may have a different cross section. Each silo 41 is a hollow container and has an upper end 43 and a lower end 45. The upper end 43 of each silo 41 is cut off essentially at right angles to the longitudinal axis of the silo 41. The lower end 45 is similarly formed but has a plurality of openings 47, preferably arched. At the upper end 43 of the silos 41, a cover 49 is located. The cover 49 is a flat plate and in its simplest form, as is shown in FIG. 1, may be rectangularly-shaped and may be hinged to the full wall 33 by a hinge 50 so as to be easily lifted upwardly to insert seed into the silos 41 but which will rest in place closing the upper ends 43 of the silos 41 to prevent rain and snow blowing into the bird feeder. Only the seed actually exposed at the openings 47 can be harmed by rain or snow but all seed above that point is protected from the elements.

Certain feeds are not seriously harmed by the weather such as suet and protection from the weather is not needed. Accordingly, the bird feeder in accordance with this invention provides other feeding areas with no weather protection or only limited weather protection. On the outside surface 29 of the partial wall 27, a net 51 is mounted for holding suet. Beneath the net 51, on the extension 15 and against the outside surface 29 of the partial wall 27, an outer container 53 is located in which any weather resistant feed, such as meat or fruit may be placed. Similarly, an inside container 55 is located against the inside surface 31 of the partial wall 27 and on the extension 15.

On the roof 39 any suitable means may be used to hang the bird feeder. Eyelets 57 may be inserted into the roof 39 and wire 59 connected thereto can be fastened to anything such as a pole or a tree or the bird feeder may be mounted on a pole (not shown) at the base 11.

The bird feeder, in accordance with this invention, provides a simply constructed unit which protects the perishable bird seed and gradually feeds the bird seed out as it is consumed while offering other locations in the same feeder for other food to be provided and to attract birds and to permit the birds using the bird feeder to be readily observed.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A bird feeder to protect perishable bird seed from the weather, such bird feeder comprising:
    a base including a main plate having a front edge and a rear edge and two side edges;
    a partial wall having an inside surface and an outside surface, the partial wall having a width substantially less than the width of the base and being aligned with the front edge;
    a full wall having a width substantially the same as the width of the main plate from side edge to side edge, the full wall and the partial wall extending substantially the same distance above the main plate and the full wall being aligned with the rear edge of the main plate;
    a roof mounted on the full wall and the partial wall above the main plate;
    a silo having an upper end and a lower end, the silo being mounted on the main plate against the full wall, the silo including a hollow container with notches at its lower end;
    a cover mounted to be removable on the upper end of the silo; and
    means for mounting the bird feeder.

2. A bird feeder according to claim 1 wherein the base further includes an extension, the extension having a width substantially less than the width of the main plate between the two side edges.

3. A bird feeder according to claim 1 wherein the base further includes all extension, the extension having a width substantially less than the width of the main plate between the two side edges, the extension having a minor portion and a major portion and being located midway between the side edges of the main plate and with the minor portion of the extension resting on the main plate at the front edge of the main plate and the major portion of the extension extending away from both the front edge and the rear edge.

4. A bird feeder according to claim 1 wherein the cover is mounted to be rotatable on the rear wall to rotate on and off the upper end of the silo.

5. A bird feeder to protect perishable bird seed from the weather, such bird feeder comprising:
    a base including a main plate and an extension, the main plate having a front edge and a rear edge and two side edges, the extension having a width substantially less than the width of the main plate between the two side edges, the extension having a minor portion and a major portion and being aligned with the side edges of the main plate and with the minor portion of the extension affixed to the main plate at the front edge and the major portion of the extension extending away from both the front edge and the rear edge and being generally midway between the two side edges;
    a partial wall having an inside surface and an outside surface extending generally vertically from the extension and being aligned with the front edge, the partial wall having a width substantially the same as the extension and being aligned with the extension;
    a full wall having a width substantially the same as the width of the main plate from side edge to side edge, the full wall and the partial wall extending substantially the same distance above the main plate and the full wall being aligned with the rear edge of the main plate;
    a roof mounted on the full wall and the partial wall above the main plate;
    a multiplicity of silos, each silo having an upper end and a lower end, each silo being mounted on the main plate against the full wall, each silo including a hollow container with notches at the lower end;
    a cover mounted on the rear wall to rotate on and off the upper ends of the silos;
    means affixed to the bird feeder for mounting the bird feeder;
    a net mounted on the outside of the partial wall; and
    a container means located on the extension against the outside surface of the partial wall and against the inside surface of the partial wall.

* * * * *